(12) United States Patent
Gillessen et al.

(10) Patent No.: US 11,077,650 B2
(45) Date of Patent: Aug. 3, 2021

(54) METHOD FOR PRODUCING A COMPOSITE PANE FOR A MOTOR VEHICLE

(71) Applicant: SAINT-GOBAIN GLASS FRANCE, Courbevoie (FR)

(72) Inventors: Stephan Gillessen, Alsdorf (DE); Pascal Bauerle, Roye (FR); Jean Jacques Bris, Bey (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 15 days.

(21) Appl. No.: 16/345,842

(22) PCT Filed: Sep. 21, 2017

(86) PCT No.: PCT/EP2017/073927
§ 371 (c)(1),
(2) Date: Apr. 29, 2019

(87) PCT Pub. No.: WO2018/077547
PCT Pub. Date: May 3, 2018

(65) Prior Publication Data
US 2019/0248122 A1    Aug. 15, 2019

(30) Foreign Application Priority Data
Oct. 28, 2016  (EP) .................................... 16196251

(51) Int. Cl.
*B32B 17/10* (2006.01)
*B32B 37/04* (2006.01)
(Continued)

(52) U.S. Cl.
CPC ........ *B32B 37/06* (2013.01); *B32B 17/10036* (2013.01); *B32B 17/10541* (2013.01);
(Continued)

(58) Field of Classification Search
CPC ....... B29L 2031/3052; B32B 17/10036; B32B 17/10541; B32B 17/10761;
(Continued)

(56) References Cited

U.S. PATENT DOCUMENTS 8,613,997 B2 * 12/2013 Day .................. B32B 17/10761
428/209
2006/0208906 A1 * 9/2006 Kokuryo .......... G06K 19/07758
340/572.8
(Continued)

FOREIGN PATENT DOCUMENTS

CH         698260 B1    6/2009
CN       201413835 Y    2/2010
(Continued)

OTHER PUBLICATIONS

International Search Report as issued in International Patent Application No. PCT/EP2017/073927, dated Jan. 19, 2018.

*Primary Examiner* — Michael A Tolin
(74) *Attorney, Agent, or Firm* — Pillsbury Winthrop Shaw Pittman LLP

(57) ABSTRACT

A method for producing a composite pane for a motor vehicle includes heating the plastic film at least in the region of the LED into a fluid state by a heating source positioned on an outer surface of the first pane or the second pane or arranged at a distance from the outer surface of the first pane or the second pane, and introducing the LED into the plastic film into the fluid state with displacement of a predefined volume of the plastic film. After introducing the LED into the plastic film, the method includes laminating the first pane and the second pane with the interposed plastic film.

9 Claims, 3 Drawing Sheets

(51) Int. Cl.
*B32B 37/06* (2006.01)
*G02B 27/01* (2006.01)
*B29L 31/30* (2006.01)

(52) U.S. Cl.
CPC .. *B32B 17/10761* (2013.01); *B32B 17/10871* (2013.01); *B32B 37/04* (2013.01); *B29L 2031/3052* (2013.01); *B32B 2605/006* (2013.01); *B60K 2370/1529* (2019.05); *B60K 2370/785* (2019.05); *G02B 2027/0196* (2013.01)

(58) Field of Classification Search
CPC ........ B32B 17/10816; B32B 17/10871; B32B 17/10981; B32B 37/04; B32B 37/06; B32B 37/182; B32B 2605/006; B60J 1/001; B60J 1/02; B60K 2370/152; B60K 2370/1529; B60K 2370/785; B60Q 3/208; G02B 2027/0196
See application file for complete search history.

(56) References Cited

U.S. PATENT DOCUMENTS

| | | |
|---|---|---|
| 2009/0114928 A1 | 5/2009 | Messere et al. |
| 2015/0244089 A1* | 8/2015 | Reul ................ B32B 17/10036 439/78 |

FOREIGN PATENT DOCUMENTS

| | | |
|---|---|---|
| EP | 2 100 722 A2 | 9/2009 |
| JP | 2009-516924 A | 4/2009 |
| WO | WO 2007/057454 A1 | 5/2007 |
| WO | WO 2007/077239 A1 | 7/2007 |
| WO | WO 2007/077466 A2 | 7/2007 |
| WO | WO 2007/085599 A1 | 8/2007 |
| WO | WO 2008/015242 A1 | 2/2008 |
| WO | WO 2008/083915 A1 | 7/2008 |
| WO | WO 2009/024278 A1 | 2/2009 |
| WO | WO 2014/055388 A2 | 4/2014 |

* cited by examiner

METHOD FOR PRODUCING A COMPOSITE PANE FOR A MOTOR VEHICLE

CROSS-REFERENCE TO RELATED APPLICATIONS

This application is the U.S. National Stage of PCT/EP2017/073927, filed Sep. 21, 2017, which in turn claims priority to European patent application number 16196251.9, filed Oct. 28, 2016. The content of these applications are incorporated herein by reference in their entireties.

The invention relates to a method for producing a composite pane for a motor vehicle.

Conventionally, electronic components are arranged between respective panes of a composite glass pane in order to fulfill various tasks depending on the purpose of the application. CH 698260 B1 discloses, for example, a built-in element with a flexible polymer film, such as PET, translucently coated using conductive oxide or metal, as well as electronic components bonded via electrically conducting adhesive spots, wherein the electrically conducting adhesive spots between the conductive coating and the components are protected against compressive, tensile, or shear forces by electrically nonconducting reinforcing adhesive spots.

EP 2100722 A2 also discloses a light sensor that is laminated in a windshield, i.e., is arranged between the outer pane and the inner pane of the windshield that are joined together by means of a thermoplastic intermediate layer. Thus, the windshield can be provided with the integrated light sensor in a compact manner, eliminating a subsequent installation of the light sensor. The light sensor is implemented in the form of flip-chip photo diodes on a circuit board. A disadvantage of the aforementioned solutions consists in that the respective electronic components are arranged adjacent the thermoplastic intermediate layer such that they rest on the intermediate layer and the intermediate layer thus compensates a thickness of the respective electronic components. Consequently, it is necessary to use electronic components that are as thin as possible in order to ensure that the intermediate layer can compensate the thickness of the electronic components. With the use of thicker electronic components, glass breakage can, consequently, disadvantageously occur when the intermediate layer is incapable of compensating the thickness of the electronic components and, thus, stresses develop in the panes.

The embedding of LEDs in a soft thermoplastic intermediate layer during the calendering of a composite pane via a pair of rollers is known from WO 2007/057454 A1. Disadvantageous with this operation is the possibility of damaging the LEDs, in particular sensitive electrical connections of the LEDs, during the calendering due to mechanical forces, in particular, shear forces. In addition, the temperature must be adjusted during the calendering for the embedding of the LEDs, possibly deviating from an optimal temperature for the calendering operation.

The object of the invention is thus to specify an improved method for producing the composite pane that enables the use of thicker electronics components without producing stresses in the composite pane. In addition, the composite pane should be producible economically with the fewest possible rejects.

The object of the present invention is accomplished according to the invention by a method for producing a composite pane for a motor vehicle according to the independent claim.

The present invention presents a method for producing a composite pane for a motor vehicle. The method comprises providing a first pane and a second pane, arranging a plastic film between the first pane and the second pane, and arranging an LED on a surface of the plastic film.

The method further includes heating the plastic film at least in the region of the LED into a fluid state and introducing the LED into the plastic film heated into the fluid state with displacement of a predefined volume of the plastic film. This is done by means of a heating source positioned on an outer surface of the first pane or the second pane or arranged at a distance from the outer surface of the first pane or the second pane. The plastic film is heated locally by the heating source exclusively in one section or part of the plastic film. Thus, there is no heating of the entire plastic film as occurs during lamination, in particular during calendering of the composite pane.

After introducing the LED in the plastic film, laminating of the first pane and the second pane with the interposed plastic film is done. In the context of the invention, the term "laminating" refers to the joining of the two panes by the interposed plastic film, wherein the plastic film is not heated locally, but instead is heated as a whole. Introducing the LED is accordingly done before the first pane and the second pane are joined by means of a thermoplastic intermediate layer to form a composite ("laminated").

According to the invention, the plastic film is locally heated into the fluid state in the region of the LED. The LED can then penetrate into the plastic film with displacement of a predefined volume and create a recess in the plastic film. Due to the displacement of the predefined volume of the plastic film in the heated state of the plastic film, it becomes advantageously possible that, in contrast to pressing the LED into the plastic film in a cold state, a total thickness of the LED and the plastic film does not exceed a safe thickness and thus the creation of stresses in the panes is avoided. A displaced volume of the plastic film can thus advantageously flow out in other directions and a thickness of the plastic film with an inserted LED corresponds substantially to a thickness of the plastic film without an inserted LED. It can further be achieved that thicker LEDs, which are, in contrast to very thin LEDs, significantly more economical to produce, can be used. Since introducing the LED into the plastic film is done before laminating the composite pane, the LED is well protected mechanically. Damaging of the LED, in particular of sensitive electrical connections, can be reliably and safely avoided. In addition, the LED can be positioned with high precision. The disadvantages of the embedding of LEDs during lamination known in the prior art can be avoided. Due to the merely local introduction of heat into the plastic film, it is advantageously avoided for bonding with the panes of the composite pane and associated air pockets in the plastic film to occur already before degassing of the composite pane. In particular, the heating of the plastic film, at least in the region of the LED, into the fluid state is carried out before deaeration of the composite pane.

Provision is made according to one embodiment for the heating source to heat the plastic film at least in the region of the LED into the fluid state with emission of radiant heat and/or convection heat. Thus, a plurality of different heating sources can be used for introducing heat into the plastic film.

Provision is made according to another embodiment for the heating source to be implemented by a heating foil that is glued onto the outer surface of the first pane or the second pane. Providing the heating foil advantageously constitutes an economical solution and enables uniform input of heat into the region of a definable area.

Provision is made according to another embodiment for the heating foil to be glued exclusively onto a part or section of the outer surface of the first pane or the second pane.

Provision is made according to another embodiment for the plastic film to be heated to a temperature of 50 to 150° C., preferably of 80 to 150° C., wherein the plastic film retains its shape after cooling below a temperature of 50° C. The aforementioned temperature range advantageously corresponds for most plastic films to a glass transition temperature at which the plastic transitions into a gum-like to viscous state and is thus flowable.

Provision is made according to another embodiment for the LED to be introduced into the plastic film heated into the fluid state while applying a force directed substantially perpendicular to the plastic film. Thus, the LED can be inserted into the plastic film with positional accuracy.

Provision is made according to another embodiment for the predefined volume of the plastic film to be displaced substantially in the longitudinal direction of the plastic film upon introducing the LED into the plastic film heated into the fluid state. Thus, the thickness of the plastic film is advantageously not increased even with insertion of a relatively thick LED.

Provision is made according to another embodiment for up to 100%, preferably up 95%, particularly preferably up to 90% of the volume of the plastic film in the direction of the thickness of the plastic film to be displaced by the LED upon introducing the LED into the plastic film heated into the fluid state. Thus, the LED is advantageously introduced into the plastic film, with only a minimal thickness of substantially 0%, 5%, or 10% of the plastic film remaining.

Provision is made according to another embodiment for the plastic film to include polyvinyl butyral, ethylene vinylacetate, polyacrylate, polymethyl methacrylate, or polyurethane or to be made of one or a plurality of these materials. Thus, depending on requirements, a suitable material of the plastic film can be selected for a corresponding application.

Provision is made according to another embodiment for the LED to be arranged on a circuit board comprising in particular a film. Thus, the power supply of the LED can be ensured and a desired positioning can be enabled depending on the structural requirements in the region of the composite pane.

Provision is made according to another embodiment for the LED to have a thickness of as much as 1 mm, preferably as much as 0.7 mm. LEDs of this thickness are significantly more economically producible than thinner LEDs and thus contribute to a cost reduction of the composite pane equipped with the LED(s).

Provision is made according to another embodiment for a light emission side of the LED to be oriented toward the first pane or toward the second pane. Thus, the LED can, for example, be oriented toward a passenger compartment or toward an exterior of the motor vehicle. This yields a different purpose depending on the orientation of the LED.

The embodiments and developments described can be combined with one another as desired. Other possible embodiments, developments, and implementations of the invention also include combinations not explicitly mentioned of features of the invention described previously or in the following with reference to the exemplary embodiments.

BRIEF DESCRIPTION OF THE DRAWINGS

They depict.

In the figures of the drawings like reference characters refer to the same or functionally equivalent elements or components, unless otherwise indicated.

Figure 1:
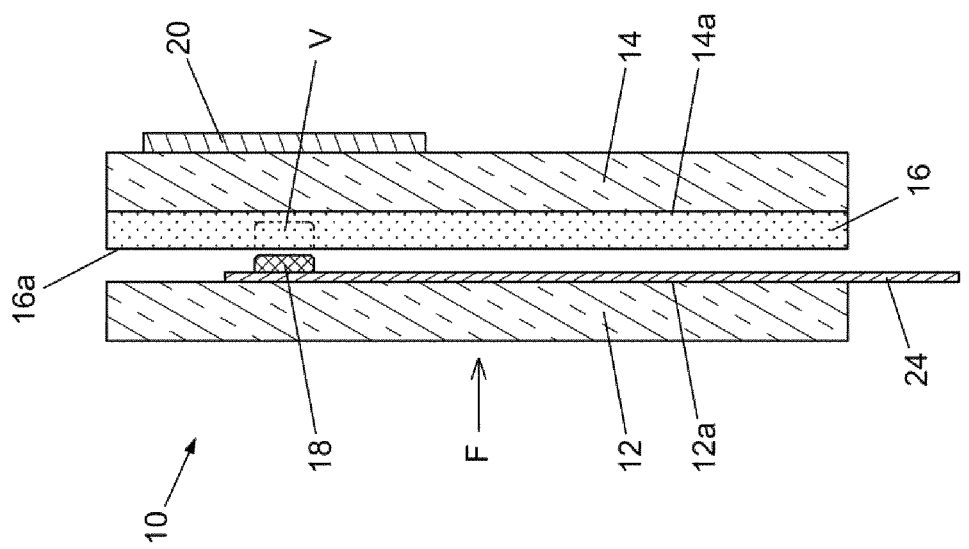
FIG. 1 a side view of a composite pane for a motor vehicle before introduction of an LED into a plastic film according to a preferred embodiment of the invention.

The composite pane 10 for the motor vehicle has a first pane 12 and a second pane 14. A plastic film 16 is arranged between the first pane 12 and the second pane 14. An LED 18 is further arranged on a surface 16a of the plastic film 16.

Furthermore, a heating source 20 is provided, which, at least in the region of the LED 18, rests against or is arranged on an outer surface of the second pane 14. Alternatively, the heating source 20 can be arranged at a distance from from the outer surface 14a of the second pane. Alternatively, the heating source 20 can, for example, be arranged on an outer surface 12a of the first pane 12 or arranged at a distance from the outer surface 12a of the first pane 12.

The heating source 20 is, in the present embodiment, implemented by a heating foil. The heating foil is glued on the outer surface 14a of the second pane 14. Alternatively, another suitable heating source, which is, for example, implemented to emit radiant heat and/or convection heat, can be provided.

The heating foil heats the plastic film 16 locally at least in the region of the LED 18 into a fluid state. In this fluid state of the plastic film 16, the LED 18 can be introduced or pressed into the heated plastic film 16 with displacement of a predefined volume V of the plastic film 16. The LED 18 is introduced into the plastic film 16 heated into the fluid state preferably while applying a force F directed substantially perpendicular to the plastic film 16. Alternatively, the force can also have a different direction. The plastic film is heated to a temperature of 50 to 150° C., preferably of 80 to 150° C. Preferably, the plastic film retains its shape after cooling below a temperature of 50° C.

The predefined volume V of the plastic film 16 is displaced substantially in the longitudinal direction of the plastic film 16 at the time of introducing the LED 18 into the plastic film 16 heated into the fluid state. Thus, a thickness of the plastic film 16 is advantageously retained. At the time of introducing the LED 18 into the plastic film 16 heated into the fluid state, as much as 90% of the volume V of the plastic film 16 in the direction of the thickness of the plastic film 16 is displaced by the LED 18.

The plastic film 16 is preferably made of polyvinyl butyral. Alternatively, the plastic film 16 can be made, for example, of ethylene vinylacetate, polyacrylate, polymethyl methacrylate, or polyurethane. The LED 18 is arranged on a circuit board comprising, in particular, another film. Alternatively, the the LED 18 can, for example, be connected to an energy source by a thin electrical cable. The number of LEDs used can be freely selected.

The heating of the the plastic film 16, at least in the region of the LED 18, into the fluid state is carried out before the deaeration of the composite pane 10. A thickness of the LED 18 is as much as 1 mm, preferably as much as 0.7 mm. A light emission side of the LED 18 is preferably oriented toward the second pane 14. Alternatively, the light emission side of the LED 18 can, for example, be oriented toward the first pane 12.

Figure 2:
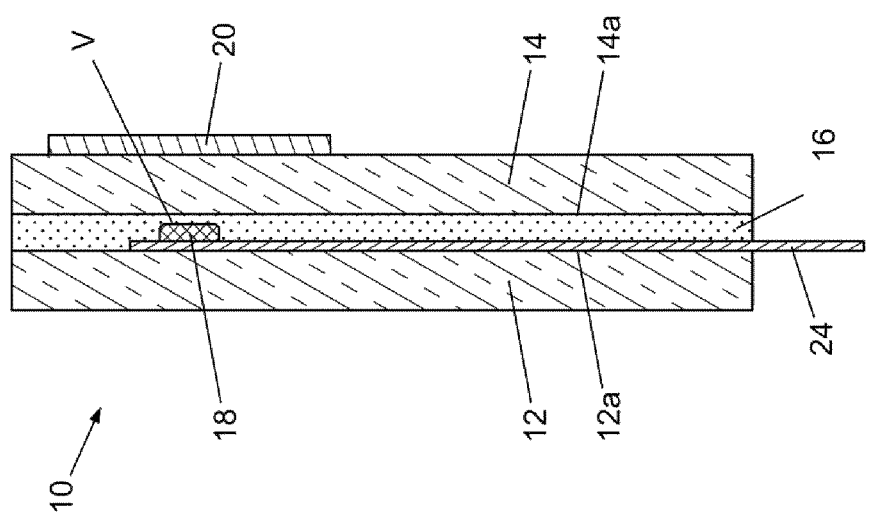
FIG. 2 a side view of a composite pane for a motor vehicle after introduction of an LED into a plastic film according to a preferred embodiment of the invention.

FIG. 2 depicts a side view of a composite pane for a motor vehicle after introducing an LED into a plastic film according to a preferred embodiment of the invention.

In the state depicted here, the plastic film has already been heated by the heating foil into the fluid state and the LED 18 introduced into the plastic film 16 heated into the fluid state with displacement of the predefined volume V of the plastic film 16.

A distance between the first pane 12 and the second pane 14 of the composite pane is, as depicted in FIG. 2, thus only minimally larger than a thickness of the LED 18. This results since the plastic film 16 heated into the fluid state is displaced in the region of the LED 18 at the time of introducing the LED 18.

In particular, as much as 90% of the volume V of the plastic film 16 in the direction of the thickness of the plastic film 16 is displaced by the LED 18. Thus, only 10% of the volume V of the plastic film 16 in the direction of the thickness of the plastic film 16 remains adjacent the LED 18 in the direction of the thickness of the plastic film 16.

Figure 3:
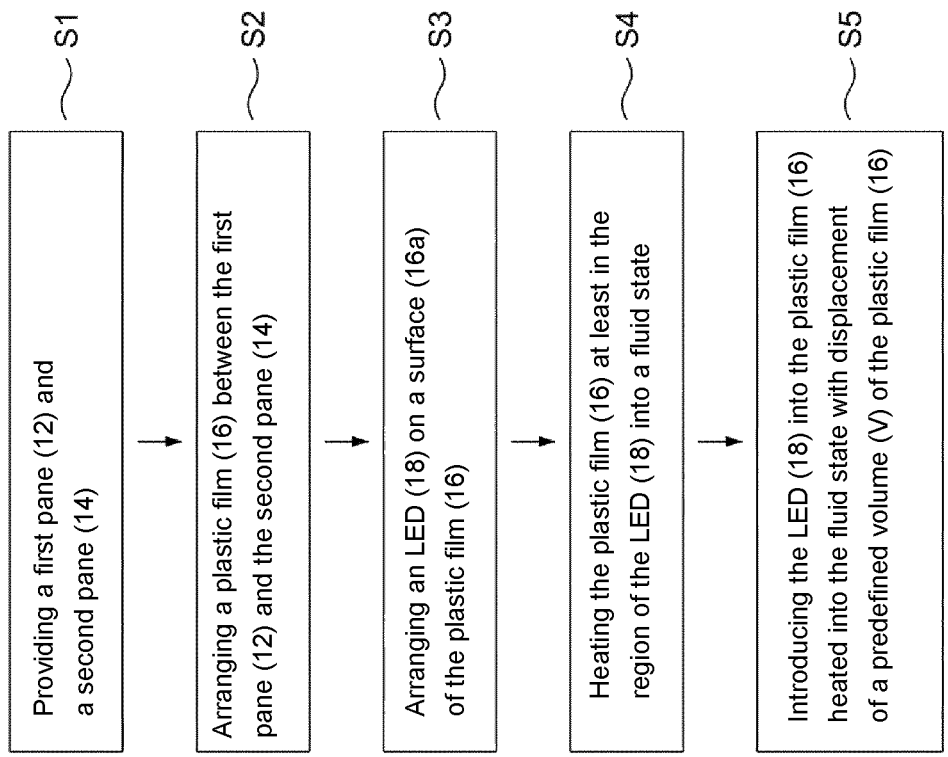
FIG. 3 a flowchart of a method for producing the composite pane for the motor vehicle according to the preferred embodiment of the invention.

FIG. 3 depicts a flowchart of a method for producing the composite pane for the motor vehicle according to the preferred embodiment of the invention.

The method comprises, according to step S1, providing a first pane and a second pane; according to step S2, arranging a plastic film between the first pane and the second pane; and according to step S3, arranging an LED on a surface of the plastic film.

The method further includes, according to step S4, heating the plastic film at least in the region of the LED into a fluid state; and according to step S5, introducing the LED into the plastic film heated into the fluid state with displacement of a predefined volume of the plastic film, as well as the subsequent lamination of the first pane and the second pane with the interposed plastic film.

The composite pane 10 of the present invention can be used not only in the motor vehicle sector, but also in the building sector in the context of building glazing.

LIST OF REFERENCE CHARACTERS

10 composite pane
12 first pane
12*a* outer surface of the first pane
14 second pane
14*a* outer surface of the second pane
16 plastic film
16*a* surface of the plastic film
18 light-emitting diode (LED)
20 heating source
22 recess
24 circuit board
F force
V volume

The invention claimed is:

1. A method for producing a composite pane for a motor vehicle, comprising:
   providing a first pane and a second pane;
   arranging a plastic film between the first pane and the second pane;
   arranging a light emitting diode (LED) on a surface of the plastic film;
   locally heating the plastic film at least in a region of the LED into a fluid state by a heating source positioned on an outer surface of the first pane or the second pane or arranged at a distance from the outer surface of the first pane or the second pane;
   introducing the LED into the plastic film heated into the fluid state with displacement of a predefined volume of the plastic film;
   after introducing the LED into the plastic film, laminating the first pane and the second pane with the interposed plastic film.

2. The method according to claim 1, wherein the heating source heats the plastic film at least in the region of the LED with emission of radiant heat and/or convection heat.

3. The method according to claim 1, wherein the heating source is includes a heating foil that is glued on the outer surface of the first pane or the second pane.

4. The method according to claim 3, wherein the heating foil is glued exclusively onto a part of the outer surface of the first pane or of the second pane.

5. The method according to claim 1, wherein the plastic film has a shape and is heated to a temperature of 50 to 150° C., and wherein the plastic film is cooled after being heated to the temperature of 50 to 150° C., the plastic film retaining its shape after cooling below a temperature of 50° C.

6. The method according to claim 5, wherein the plastic film is heated to a temperature of 80 to 150° C.

7. The method according to claim 1, wherein the LED is introduced into the plastic film heated into the fluid state while applying a force directed substantially perpendicular to the plastic film.

8. The method according to claim 1, wherein the predefined volume of the plastic film is displaced substantially in a longitudinal direction of the plastic film upon introduction of the LED into the plastic film heated into the fluid state.

9. The method according to claim 1, wherein the plastic film has a thickness, and wherein upon introduction of the LED into the plastic film heated into the fluid state, a volume of the plastic film in a direction of the thickness of the plastic film is displaced by the LED so that a remaining thickness of the plastic film after heating at a location where the LED is introduced is less than 90% of the thickness of the plastic film before heating.

\* \* \* \* \*